(12) United States Patent
Lim et al.

(10) Patent No.: US 8,702,073 B2
(45) Date of Patent: Apr. 22, 2014

(54) SHOCK ABSORBER CAPABLE OF DAMPING VIBRATION

(75) Inventors: JuiJing Lim, Singapore (SG); Chenyang Ding, Singapore (SG); Xiong Liu, Singapore (SG); MingZhong Ding, Singapore (SG); KianKeong Ooi, Singapore (SG); ChoonKiat Lim, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 1336 days.

(21) Appl. No.: 11/749,850

(22) Filed: May 17, 2007

(65) Prior Publication Data

US 2008/0284074 A1 Nov. 20, 2008

(51) Int. Cl.
*F16M 1/00* (2006.01)
*F16M 13/00* (2006.01)

(52) U.S. Cl.
USPC ............................ 267/136; 267/141; 248/638

(58) Field of Classification Search
USPC ............... 267/136, 195, 141, 141.2; 361/683, 361/685, 679; 360/97.01, 97.02; 206/586; 248/638, 560
See application file for complete search history.

(56) References Cited

U.S. PATENT DOCUMENTS

| | | | |
|---|---|---|---|
| 3,997,876 A | 12/1976 | Frush | |
| 4,575,776 A | 3/1986 | Stephens et al. | |
| 5,596,461 A * | 1/1997 | Stefansky | 360/97.01 |
| 6,034,841 A | 3/2000 | Albrecht et al. | |
| 6,292,455 B1 * | 9/2001 | Saruwatari et al. | 720/692 |
| 6,324,054 B1 * | 11/2001 | Chee et al. | 361/679.34 |
| 6,545,865 B2 | 4/2003 | Albrecht et al. | |
| 6,704,161 B1 | 3/2004 | Pham et al. | |
| 6,735,043 B2 | 5/2004 | Bernett et al. | |
| 6,826,018 B2 | 11/2004 | Kuwajima et al. | |
| 6,873,524 B2 | 3/2005 | Kaczeus, Sr. et al. | |
| 6,999,909 B1 | 2/2006 | Subrahmanyan | |
| 7,023,657 B2 | 4/2006 | Sohn et al. | |
| 7,106,582 B2 | 9/2006 | Albrecht et al. | |
| D534,911 S | 1/2007 | Hisatsune | |
| 7,483,238 B2 * | 1/2009 | Xu et al. | 360/97.01 |
| 2002/0043608 A1 * | 4/2002 | Nakata et al. | 248/560 |
| 2004/0255313 A1 * | 12/2004 | Kaczeus et al. | 720/651 |
| 2005/0046996 A1 | 3/2005 | Kimura et al. | |
| 2006/0261528 A1 * | 11/2006 | Cheng et al. | 267/136 |

OTHER PUBLICATIONS

U.S. Appl. No. 11/298,220, filed Dec. 9, 2005, entitled "A Shock Absorbing Device for an Enclosure".
U.S. Appl. No. 11/298,878, filed Dec. 9, 2005, entitled "An Electrical Connector Device for a Disc Drive".

* cited by examiner

*Primary Examiner* — Melody Burch
(74) *Attorney, Agent, or Firm* — Leanne Taveggia Farrell; Westman, Champlin & Koehler, P.A.

(57) ABSTRACT

A shock absorber is provided that also includes vibration damping. The shock absorber includes at least one shock absorbing frame member that partially surrounds an electronic device enclosure. The shock absorber also includes at least two protrusions that protrude from the at least one shock absorbing frame member. Each protrusion extends beyond the at least one shock absorbing frame member from a recessed surface recessed into the at least one shock absorbing frame member.

13 Claims, 10 Drawing Sheets

SHOCK ABSORBER CAPABLE OF DAMPING VIBRATION

BACKGROUND

An electronic portable device often includes certain functions that require the use of a high capacity data storage system. As demand for electronic portable devices increases so does the demand for high capacity, small sized and low cost data storage systems. Unlike solid-state data storage devices, rotatable data storage devices provide a higher storage capacity. However, rotatable data storage devices are more susceptible to failure due to sources of vibration or shock. For example, a rotatable data storage device in a mobile phone is susceptible to vibrations from the mobile phone's ring-tone, vibrator and upon accidental drops. These different kinds of vibrations can affect the tracking performance of the rotatable data storage device by causing position error of the data head.

Typically, rotatable data storage devices in electronic portable devices are fitted with a shock absorber made of materials, such as elastomers, for protection of the device from vibration sources, such as ring-tones, vibrators and accidental drops. In general, however, shock absorbers are not optimized for vibration damping. To be effective, a shock absorber needs to be stiff to absorb shocks after occurrences of drops from large heights. As a result, in general, shock absorbers are too stiff to effectively damp vibrations because vibration dampers need to be soft to be effective. Therefore, there is a need to make a shock absorber that is optimized for shock absorption and vibration damping.

SUMMARY

A shock absorber is provided that also includes vibration damping. The shock absorber includes at least one shock absorbing frame member that partially surrounds an electronic device enclosure. The shock absorber also includes at least two protrusions that protrude from the at least one shock absorbing frame member. Each protrusion extends beyond the at least one shock absorbing frame member from a recessed surface recessed into the at least one shock absorbing frame member. The at least two protrusions can protrude from an inner surface of the shock absorbing frame member, an outer surface of the shock absorbing frame member or both.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
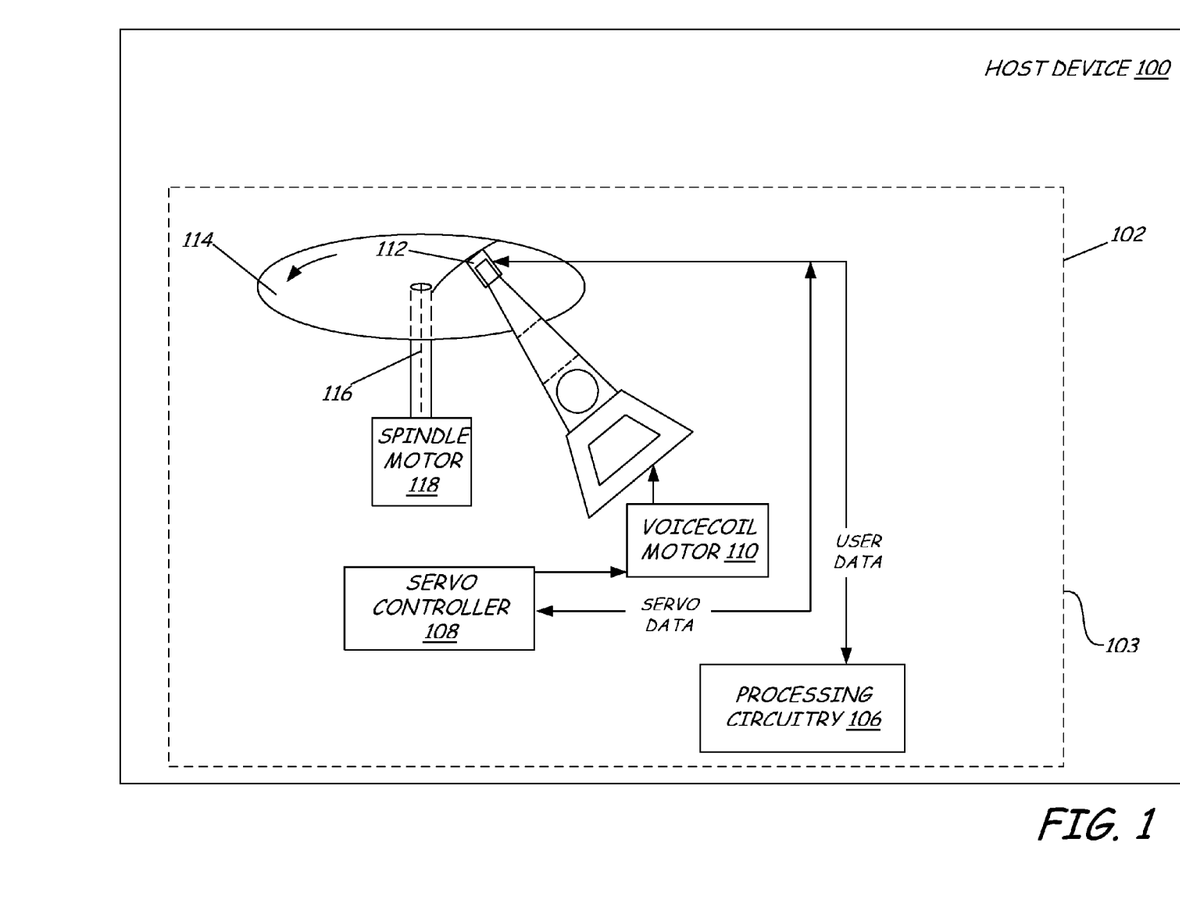
FIG. 1 is a simplified block diagram of a host device including a rotatable data storage device.

FIG. 1 is a simplified block diagram of a host device 100 incorporating a rotatable data storage device 102. Host device 100 is an electronic portable device, such as a mobile phone, a digital music player, a personal data assistant (PDA) and etc. Rotatable data storage device 102 includes an enclosure 103 that houses processing circuitry 106. The various operations of rotatable data storage device 102 are controlled by processing circuitry 106 with the use of programming stored in a memory. Rotatable data storage device 102 also includes servo controller 108 which generates control signals applied to a voice coil motor (VCM) 110. Processing circuitry 106 instructs servo controller 108 to seek slider 112 to desired tracks of a medium or disc 114. Although rotatable data storage device 102 illustrates a single slider 112 and a single disc 114, it should be realized that data storage device 102 can include multiple sliders and multiple discs. Servo controller 108 is also responsive to servo data, such as servo burst information recorded on medium or disc 114 and embedded in servo fields or wedges included in data tracks. Medium or disc 114 is rotatable about a central axis 116 by a spindle motor 118.

Unlike a solid-state data storage device, rotatable data storage device 102 provides a higher storage capacity for host device 100. High data storage capacity is desirable especially for audio and video capability, which is often a feature of host device 100. However, rotatable data storage device 102 is more susceptible to failure, compared to solid-state data storage systems, due to sources of vibration or shock emanating from host device 100. In particular, two unique disturbance sources that commonly affect a portable electronic device, such as a mobile phone, include a vibrator and a speaker. In a mobile phone application, both sources or one of the sources of disturbance occur frequently to indicate an incoming phone call. When the vibrator or speaker is activated, such disturbance can cause position error of slider 120.

Figure 2:
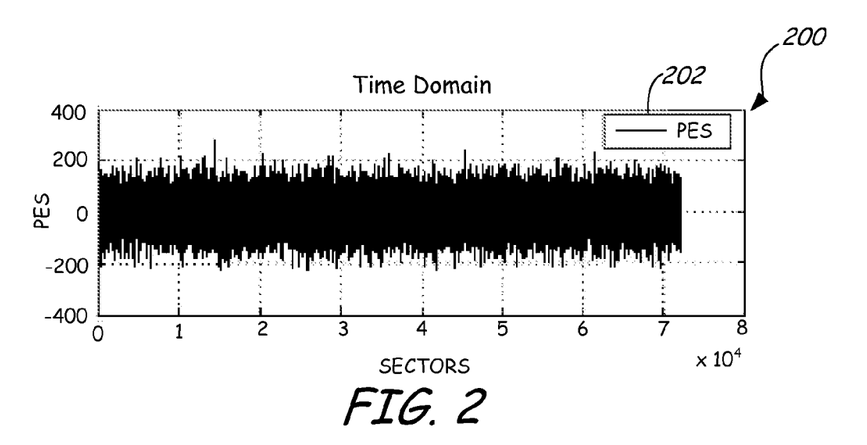
FIG. 2 illustrates a graphical representation of a position error signal as applied to the voice coil motor from the servo controller of the rotatable data storage device illustrated in FIG. 1.
Figure 3:
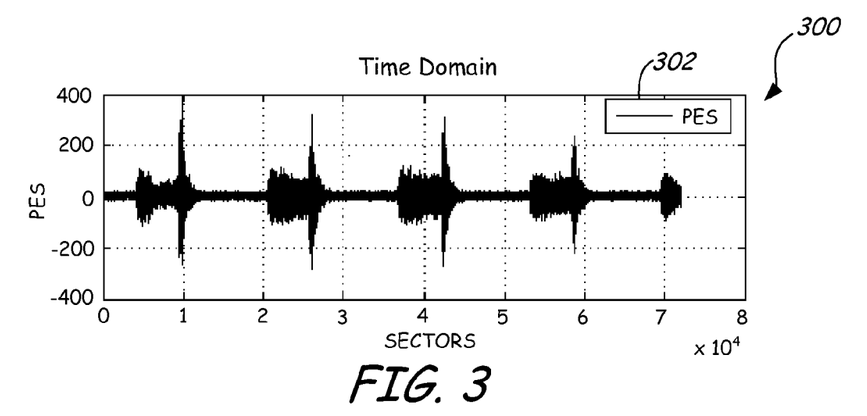
FIG. 3 is a graphical representation of a position error signal when a vibrator is activated in a mobile phone.

FIG. 2 is a graphical representation 200 of a position error signal (PES) 202 as applied to a voice coil motor from a servo controller. PES 202 in FIG. 2 represents a PES of a servo controller in a rotatable data storage system when there is no shock absorber and neither the vibrator nor the speaker of the host device is activated. FIG. 3 is a graphical representation 300 of a PES 302 of a servo controller when a vibrator is activated in a host device and the rotatable data storage system is fitted with a typical shock absorber. With reference to FIGS. 2-3, it is easily shown that a mobile phone's vibrator causes significant off-track results that are not improved by a typical shock absorber.

Rotatable data storage devices can be fitted with a shock absorber made of materials, such as elastomers, for protection of the device from vibration sources, such as ring-tones, vibrators and accidental drops. However, typical shock absorbers are not optimized for vibration damping. An effective shock absorber needs to be stiff to absorb shocks. However, to damp vibration, a damper needs to be soft to be effective. The following embodiments describe shock absorbers that are capable of effectively absorbing shock as well as effectively damping vibration.

Figure 4:
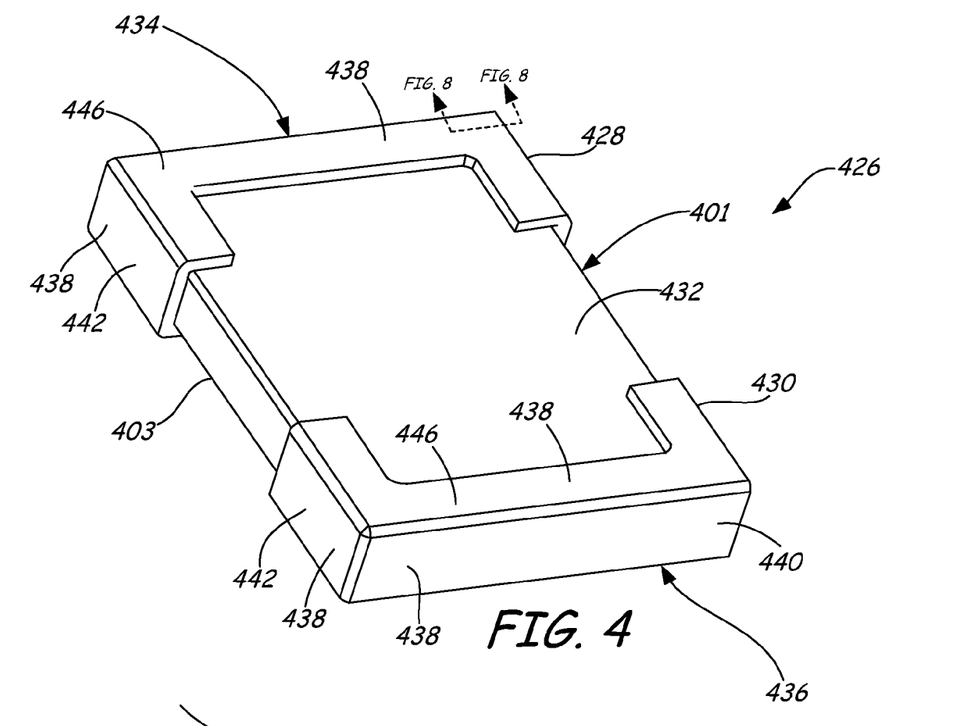
FIG. 4 illustrates a perspective view of a shock absorber that partially surrounds an enclosure of a data storage device under one embodiment.

FIG. 4 illustrates a perspective view of one embodiment of a shock absorber 426 that partially surrounds an enclosure 403 of a rotatable storage device 401. Shock absorber 426 includes first and second shock absorbing frame members 428 and 430 that surround an outer surface 432 of enclosure 403. First frame member 428 surrounds a first end 434 of enclosure 403 and second frame member 430 surrounds a second end 436 of enclosure 403.

Figure 5:
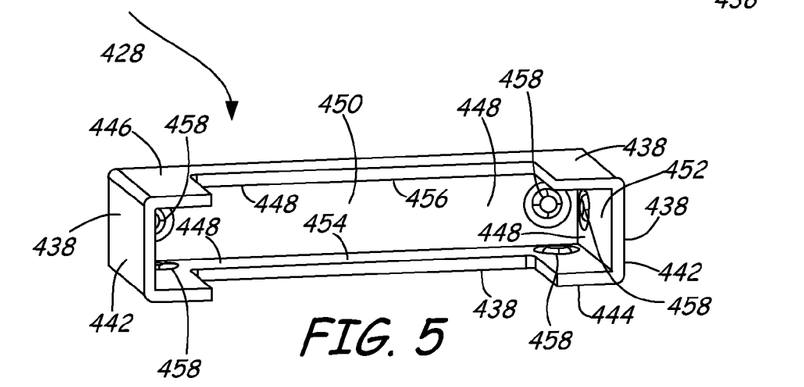
FIG. 5 illustrates a detailed perspective view of a first frame member of the shock absorber illustrated in FIG. 4.

FIG. 5 illustrates a detailed perspective view of first frame member 428 of shock absorber 426. However, it should be noted that the discussion related to first frame member 428 illustrated in FIG. 5 can also be applied to second frame member 430 since each of frame members 428 and 430 are substantially the same. Referring to both FIGS. 4 and 5, each frame member 428 and 430 includes a plurality of surfaces. Each frame member 428 and 430 includes five outer surfaces 438 (FIGS. 4 and 5). One of the outer surfaces is an outer end surface 440 (as illustrated by second member 430 in FIG. 4), two of the outer surfaces are outer side surfaces 442 (illustrated in FIGS. 4 and 5), one of the outer surfaces is an outer bottom surface 444 (as illustrated in FIG. 5) and one of the outer surfaces is an outer top surface 446 (as illustrated in FIGS. 4 and 5). Each frame member 428 and 430 also includes five inner surfaces 448 (of which some are illustrated in FIG. 5). One of the inner surfaces is an inner end surface 450, two of the inner surfaces are inner side surfaces 452 (of which one is illustrated in FIG. 5), one of the inner surfaces is an inner bottom surface 454 and one of the outer surfaces is an inner top surface 456.

At least two inner protrusions 458 (FIG. 5) protrude from a surface of each of the frame members 428 and 430 and are in contact with outer surface 432 of enclosure 403 in the embodiment illustrated in FIGS. 4 and 5. In particular, in the embodiment illustrated in FIGS. 4 and 5, at least two inner protrusions 458 protrude from an inner surface(s) 448 of each of the frame members 428 and 430. As illustrated in FIG. 5, at least two inner protrusions 458 protrude from each inner end surface 450, protrude from inner side surfaces 452, protrude from each inner bottom surface 454 and protrude from each inner top surface 456. It should be realized, however, that any number of inner protrusions can protrude from any inner surface as long as there are an equal amount of inner protrusions located on each side of a center of each inner surface 448 and spaced an equal distance from the center of each inner surface. Although inner protrusions 458 are illustrated in FIG. 5 as being of cylindrical shape, inner protrusions 458 can be of any suitable shape.

Figure 6:
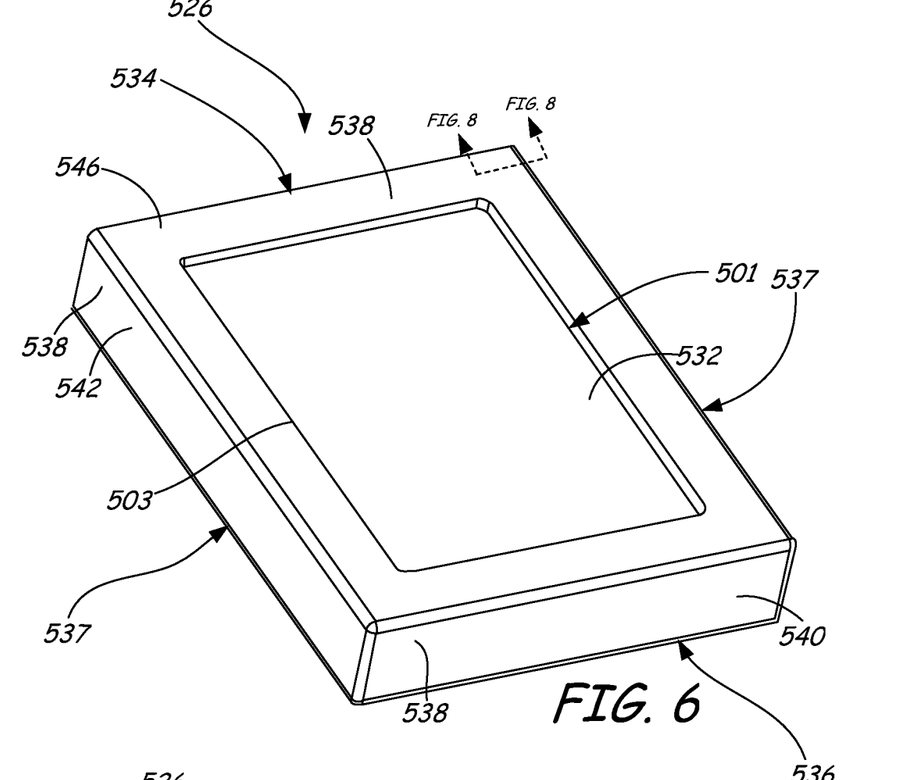
FIG. 6 illustrates a perspective view of a shock absorber that partially surrounds an enclosure of a data storage device under one embodiment.

FIG. 6 illustrates a perspective view of another embodiment of a shock absorber 526 that partially surrounds an enclosure 503 of a rotatable storage device 501. Shock absorber 526 is a single shock absorbing frame member that surrounds a portion of an outer surface 532 of enclosure 503. Single frame member 526 surrounds a first end 534, a second end 536 and sides 537 of enclosure 503.

Figure 7:
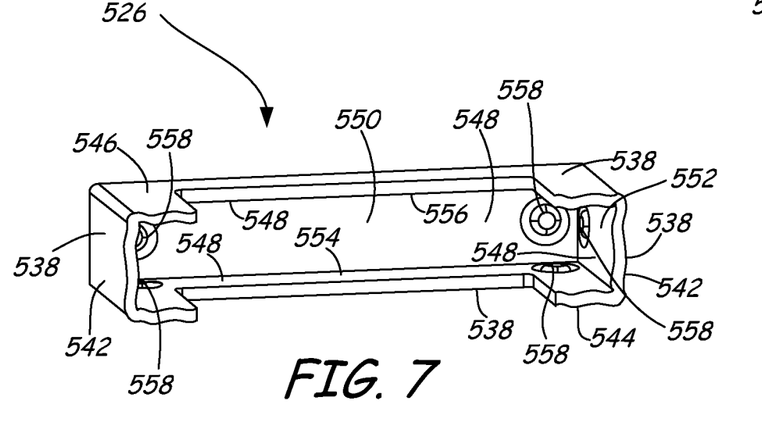
FIG. 7 illustrates a detailed perspective view of a portion of a frame member of the shock absorber illustrated in FIG. 6.

FIG. 7 illustrates a detailed perspective view of a cut away portion of single frame member 526. Although FIG. 7 is similar to FIG. 5, the embodiment in FIG. 7 is directed to a detailed view of a single frame member of a shock absorber where the embodiment illustrated in FIG. 5 is a detailed view of one of two frame members of a shock absorber. Referring to both FIGS. 6 and 7, single frame member 526 includes a plurality of surfaces. Single frame member 526 includes six outer surfaces 538 (illustrated in FIGS. 6 and 7). Two of the outer surfaces 538 are outer end surfaces 540 (of which one is illustrated in FIG. 6), two of the outer surfaces are outer side surfaces 542 (illustrated in FIGS. 6 and 7), one of the outer surfaces is an outer bottom surface 544 (FIG. 7) and one of the outer surfaces is an outer top surface 546 (FIG. 7). Single frame member 526 includes six inner surfaces 548 (of which some is illustrated in FIG. 7). Two of the inner surfaces are inner end surfaces 550 (of which one is illustrated in FIG. 7), two of the inner surfaces are inner side surfaces 552 (of which one is illustrated in FIG. 7), one of the inner surfaces is an inner bottom surface 554 (FIG. 7) and one of the inner surfaces is an inner top surface 556 (FIG. 7).

At least two inner protrusions 558 protrude from a surface of single frame member 526 and are in contact with outer surface 532 of enclosure 503 in the embodiment illustrated in FIGS. 6 and 7. As illustrated at least partially in FIG. 7, at least two inner protrusions 558 protrude from an inner surface 548 of single frame member 526. As illustrated in FIG. 7, at least two protrusions protrude from each inner end surface 550, protrude from inner side surface 552, protrude from inner bottom surface 554 and protrude from inner top surface 556. It should be realized, however, that any number of inner protrusions can protrude from any inner surface as long as there are an equal amount of inner protrusions located on each side of a center of each inner surface 548 and spaced an equal distance from the center of each inner surface. Although inner protrusions 558 are illustrated in FIG. 7 as being of cylindrical shape, inner protrusions 558 can be of any suitable shape.

Figure 8:
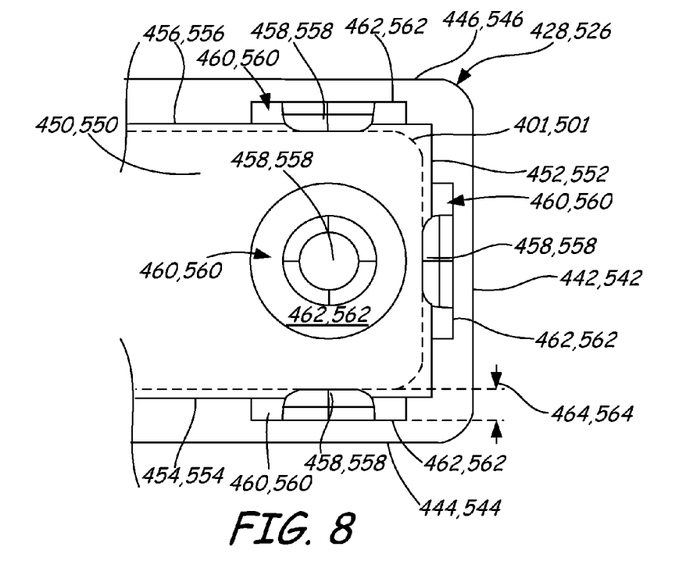
FIG. 8 illustrates a sectional view of a portion of either the first frame member of FIGS. 4 and 5 or a sectional view of the single frame member of FIGS. 6 and 7.

FIG. 8 illustrates a sectional view of a portion of either first frame member 428 of FIGS. 3 and 4 or a sectional view of single frame member 526 of FIGS. 6 and 7. The sectional view is taken along a line of sight as indicated by dashed lines in FIG. 4 or in dashed lines indicated in FIG. 6. FIG. 8 illustrates section views of inner protrusions 458, 558 protruding from inner side surface 452, 552, protruding from inner bottom surface 454, 554 and protruding from inner top surface 456, 556. FIG. 8 also illustrates an inner protrusion 458, 558 formed with inner end surface 450, 550.

Each inner surface 448, 548 (FIGS. 5 and 7) of either first frame member 428 or single frame member 526 includes a depression located about each inner protrusion 458, 558. As illustrated in FIG. 8, inner end surface 450, 550, inner side surface 452, 552, inner bottom surface 454, 554 and inner top surface 456, 556 include a depression 460, 560 located about each inner protrusion 458, 558. One depression 460, 560 is recessed from inner side surface 452, 552 towards outer side surface 442, 542, one depression 460, 560 is recessed from inner bottom surface 454, 554 towards outer bottom surface 444, 544, one depression 460, 560 is recessed from inner top surface 456, 556 towards outer top surface 446, 546 and one depression 460, 560 is recessed from inner end surface 450, 550 towards outer end surface 440, 540 (FIGS. 4 and 6). Such depressions 460, 560 are positioned about inner protrusions 458, 558 to allow the protrusions to have an increased height or thickness otherwise unavailable if the protrusions extended from an inner surface 448, 548.

An increased height and thickness of the inner protrusions allows the inner protrusions to act as vibration dampers independently from the shock absorbing frame 428, 526 in the presence of vibration and shock emanating from a host device. In particular, each depression 460, 560 includes a recessed surface 462, 562 that are recessed from inner end surface 450, 550, inner side surface 452, 552, inner bottom surface 454, 554 and inner top surface 456, 556. Each inner protrusion 458, 558 extends from recessed surface 462, 562 and inwardly from inner end surface 450, 550, inner side surface 452, 552, inner bottom surface 454, 554 or inner top surface 456, 556 to contact rotatable storage device 401, 501 as illustrated in phantom (indicated in dashed lines). Inner protrusions 458, 558 can inwardly extend from each recessed surface 462, 562 by a thickness dimension 464, 564 of approximately 1.0 mm or less. In FIG. 8, inner protrusions 458, 558 extend from each recessed surface 462, 562 a thickness dimension of 0.6 mm. In FIG. 8, inner protrusions 458, 558 protrude from inner end surface 450, 550, inner side surface 452, 552, inner bottom surface 454, 554 and inner top surface 456, 556 by 0.2 mm. Therefore, shock absorbers 426, 526 can effectively absorb a high amount of shock emanating from a host device using frames 428, 430 and 528, and shock absorbers 426, 526 can simultaneously damp vibration emanating from a host device effectively using protrusions 458, 558.

Figure 9:
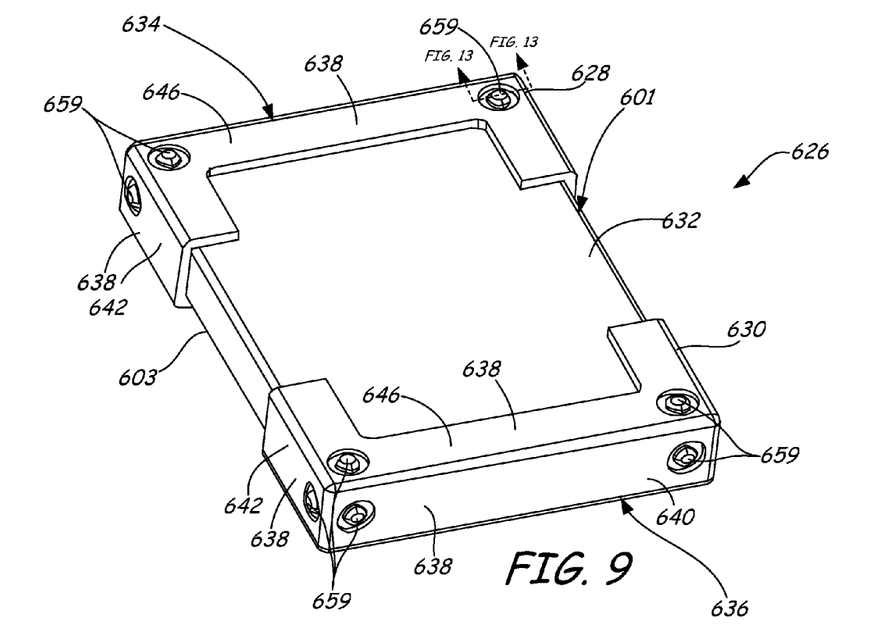
FIG. 9 illustrates a perspective view of a shock absorber that partially surrounds an enclosure of a data storage device under one embodiment.

FIG. 9 illustrates a perspective view of another embodiment of a shock absorber 626 that partially surrounds an enclosure 603 of a rotatable storage device 601. Shock absorber 626 includes first and second shock absorbing frame members 628 and 630 that surround an outer surface 632 of enclosure 603. First frame member 628 surrounds a first end 634 of enclosure 603 and second frame member 630 surrounds a second end 636 of enclosure 603.

Figure 10:
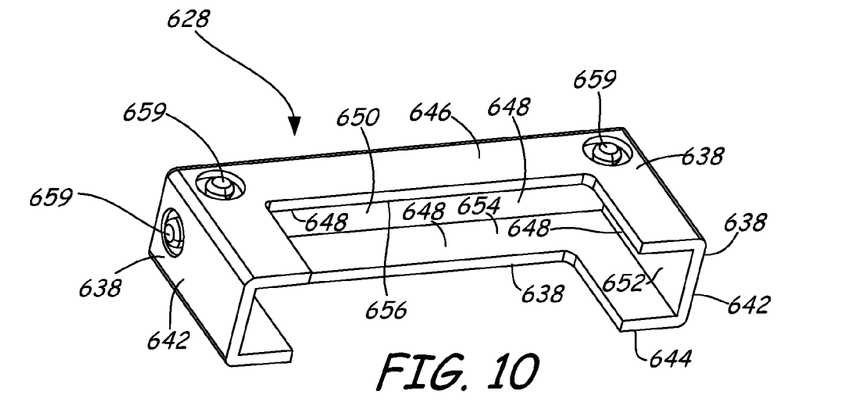
FIG. 10 illustrates a detailed perspective view of a first frame member of the shock absorber illustrated in FIG. 9.

FIG. 10 illustrates a detailed perspective view of first frame member 628 of shock absorber 626 (FIG. 9). However, it should be noted that the discussion related to first frame member 628 illustrated in FIG. 10 can also be applied to second frame member 630 since each of frame members 628 and 630 are substantially the same. Referring to both FIGS. 9 and 10, each frame member 628 and 630 includes a plurality of surfaces. Each frame member 628 and 630 includes five outer surfaces 638 (FIGS. 9 and 10). One of the outer surfaces is an outer end surface 640 (as illustrated by second member 630 in FIG. 9), two of the outer surfaces are outer side surfaces 642 (illustrated in FIGS. 9 and 10), one of the outer surfaces is an outer bottom surface 644 (as illustrated in FIG. 10) and one of the outer surfaces is an outer top surface 646 (as illustrated in FIGS. 9 and 10). Each frame member 628 and 630 also includes five inner surfaces 648 (of which some are illustrated in FIG. 10). One of the inner surfaces is an inner end surface 650, two of the inner surfaces are inner side surfaces 652 (of which one is illustrated in FIG. 10), one of the inner surfaces is an inner bottom surface 654 and one of the outer surfaces is an inner top surface 656.

At least two protrusions 659 (FIGS. 9 and 10) protrude from a surface of each of the frame members 628 and 630 and are in contact with outer surface 632 of enclosure 603 in the embodiment illustrated in FIGS. 9 and 10. In particular, in the embodiment illustrated in FIGS. 9 and 10, at least two outer protrusions 659 protrude from an outer surface(s) 638 of each of the frame members 628 and 630. As illustrated in FIGS. 9 and 10, at least two outer protrusions 659 protrude from each outer end surface 640, protrude from outer side surfaces 642, protrude from each outer bottom surface 644 and protrude from outer top surface 646. It should be realized, however, that any number of outer protrusions can protrude from any outer surface as long as there are an equal amount of outer protrusions located on each side of a center of each outer surface 638 and spaced an equal distance from the center of each outer surface. Although outer protrusions 659 are illustrated in FIGS. 9 and 10 as being of cylindrical shape, outer protrusions 659 can be of any suitable shape.

Figure 11:
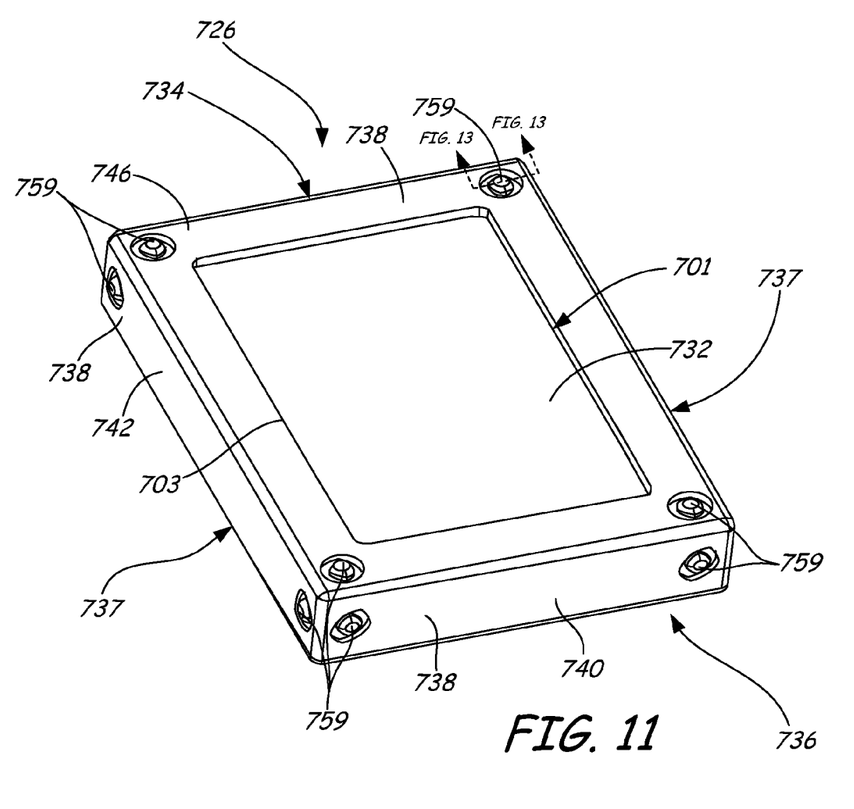
FIG. 11 illustrates a perspective view of a shock absorber that partially surrounds an enclosure of a data storage device under one embodiment.

FIG. 11 illustrates a perspective view of another embodiment of a shock absorber 726 that partially surrounds an enclosure 703 of a rotatable storage device 701. Shock absorber 726 is a single shock absorbing frame member that surrounds a portion of an outer surface 732 of enclosure 703. Single frame member 726 surrounds a first end 734, a second end 736 and sides 737 of enclosure 703.

Figure 12:
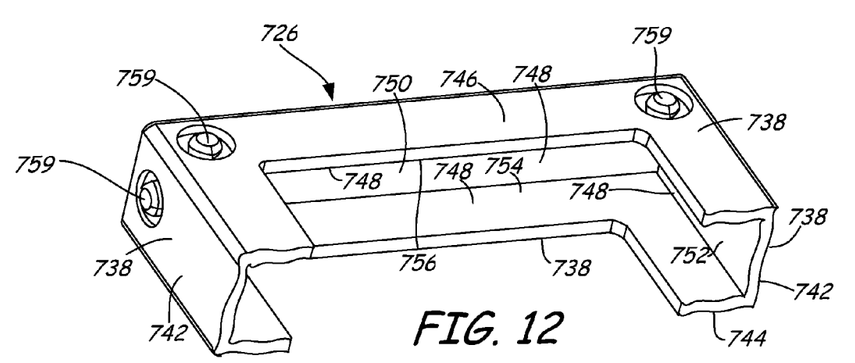
FIG. 12 illustrates a detailed perspective view of a portion of a frame member of the shock absorber illustrated in FIG. 11.

FIG. 12 illustrates a detailed perspective view of a cut away portion of single frame member 726. Although FIG. 12 is similar to FIG. 10, the embodiment in FIG. 12 is directed to a detailed view of a single frame member of a shock absorber where the embodiment illustrated in FIG. 10 is a detailed view of one of two frame members of a shock absorber. Referring to both FIGS. 11 and 12, single frame member 726 includes a plurality of surfaces. Single frame member 726 includes six outer surfaces 738 (illustrated in FIGS. 11 and 12). Two of the outer surfaces 738 are outer end surfaces 740 (of which one is illustrated in FIG. 11), two of the outer surfaces are outer side surfaces 742 (illustrated in FIGS. 11 and 12), one of the outer surfaces is an outer bottom surface 744 (FIG. 12) and one of the outer surfaces is an outer top surface 746 (FIGS. 11 and 12). Single frame member 726 includes six inner surfaces 748 (of which some are illustrated in FIG. 12). Two of the inner surfaces are inner end surfaces 750 (FIG. 12), two of the inner surfaces are inner side surfaces 752 (of which some are illustrated in FIG. 12), one of the inner surfaces is an inner bottom surface 754 (FIG. 12) and one of the inner surfaces is an inner top surface 756 (FIG. 12).

At least two outer protrusions 759 protrude from a surface of single frame member 726 in the embodiment illustrated in FIGS. 11 and 12. As illustrated at least partially in FIG. 12, at least two outer protrusions 759 protrude from an outer surface 738 of single frame member 726. As illustrated in FIG. 12, at least two protrusions protrude from each outer end surface 740, protrude from outer side surface 742, protrude from outer bottom surface 744 and protrude from outer top surface 746. It should be realized, however, that any number of outer protrusions can protrude from any outer surface as long as there are an equal amount of outer protrusions 759 located on each side of a center of each outer surface 738 and spaced an equal distance from the center of each outer surface. Although protrusions 759 are illustrated in FIG. 7 as being of cylindrical shape, outer protrusions 759 can be of any suitable shape.

Figure 13:
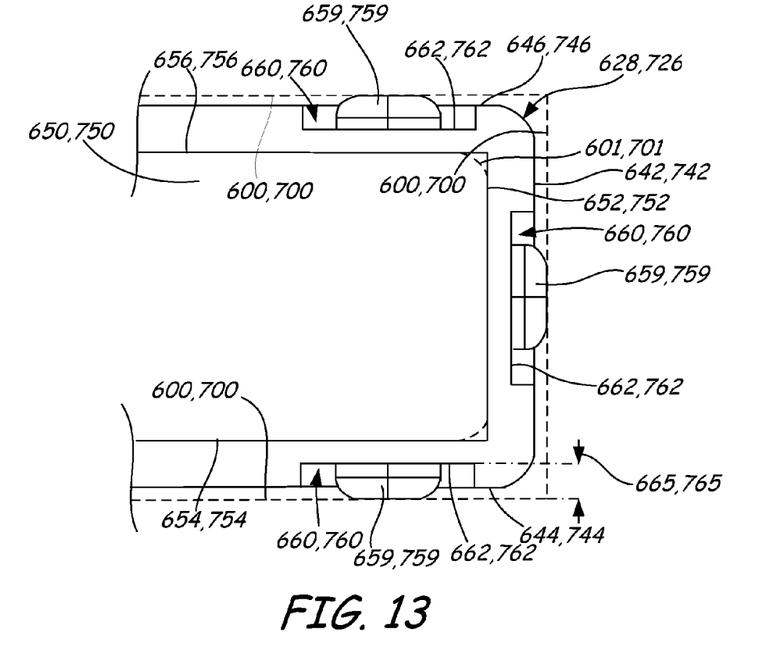
FIG. 13 illustrates a sectional view of a portion of either the first frame member of FIGS. 9 and 10 or a sectional view of the single frame member of FIGS. 11 and 12.

FIG. 13 illustrates a sectional view of a portion of either first frame member 628 of FIGS. 9 and 10 or a sectional view of single frame member 726 of FIGS. 11 and 12. The sectional view is taken along a line of sight as indicated by dashed lines in FIG. 9 or in dashed lines indicated in FIG. 11. FIG. 13 illustrates section views of outer protrusions 659, 759 protruding from outer side surface 642, 742, protruding from outer bottom surface 644, 744 and protruding from outer top surface 646, 746. Although hidden from view in FIG. 13, frame member 628, 726 also includes an outer protrusion formed with an outer end surface.

Each outer surface 638, 738 (FIGS. 9 and 11) of either first frame member 628 or single frame member 726 includes a depression for each outer protrusion 659, 759. As illustrated in FIG. 13, outer end surface 640, 740 (FIGS. 9 and 11), outer side surface 642, 742, outer bottom surface 644, 744 and outer top surface 646, 746 includes a depression 660, 760 located about each outer protrusion 659, 759. One depression 660, 760 is recessed from outer side surface 642, 742 towards inner side surface 652, 752, one depression 660, 760 is recessed from outer bottom surface 644, 744 towards inner bottom surface 654, 754, one depression 660, 760 is recessed from outer top surface 646, 746 towards inner top surface 656, 756 and one depression (although not illustrated in FIG. 13), is recessed from an outer end surface towards inner end surface 650, 750. Such depressions 660, 760 positioned about protrusions 658, 758 allow the protrusions to have an increased height or thickness otherwise unavailable if the protrusions extend from an outer surface 638, 738.

An increased height and thickness allows the protrusions to act as vibration dampers independently from the shock absorbing frame 628, 726 in the presence of vibration and shock emanating from a host device. In particular, each depression 660, 760 includes recessed surfaces 662, 762 that are recessed from outer end surface (not illustrated in FIG. 13), outer side surface 642, 742, outer bottom surface 644, 744 and outer top surface 646, 746. Each outer protrusion 659, 759 extends from recessed surface 662, 762 and outwardly from outer end surface 640, 740 (not illustrated in FIG. 13), outer side surface 642, 742, outer bottom surface 644, 744 or outer top surface 646, 746 to contact a casing of a host device 600, 700 as illustrated in phantom (indicated in dashed lines). Outwardly extending outer protrusions 659, 759 dampen vibration that affects rotatable data storage device 601, 701 as illustrated in phantom (indicated in dashed lines of FIG. 13). Outer protrusions 659, 759 can outwardly extend from each recessed surface 662, 762 towards host device 600, 700 by a thickness dimension 665, 765 of approximately 1.0 mm or less. In FIG. 13, outer protrusions 659, 759 extend from each recessed surface 662, 662 a thickness dimension 665, 765 of 0.6 mm. In FIG. 13, outer protrusions 659, 759 protrude from outer end surface (not illustrated in FIG. 13), outer side surface 642, 742, outer bottom surface 644, 744 and outer top surface 646, 746 by 0.2 mm. Therefore, shock absorbers 626, 726 can effectively absorb a high amount of shock emanating from a host device using frames 628, 630 and 728, and shock absorbers 626, 726 can simultaneously damp vibration effectively using protrusions 658, 758.

Figure 14:
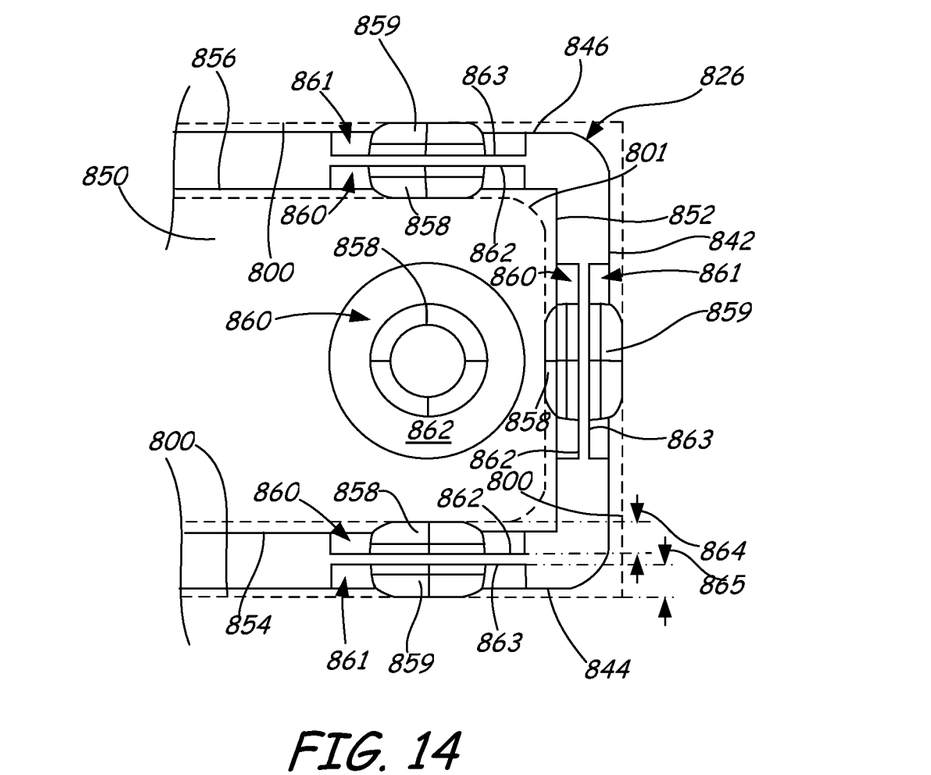
FIG. 14 illustrates a sectional view of a shock absorber that partially surrounds an enclosure of a data storage device under one embodiment.

FIG. 14 illustrates a sectional view of another embodiment of a shock absorber 826 that at least partially surrounds a rotatable data storage device 801. Shock absorber 826 can be either a single shock absorbing frame member or include a pair of shock absorbing frame members (such as those illustrated in FIGS. 4 and 9) that surround at least a portion of a rotatable data storage device 801.

At least two inner protrusions 858 (in contact with an outer surface of rotatable data storage device 801) and at least two outer protrusions 859 protrude from surfaces of frame member 826 in the embodiment illustrated in FIG. 14 even though not specifically shown. However, it should be realized that any number of inner protrusions 858 and outer protrusions 859 can protrude from an outer end surface (not shown in FIG. 14), an inner end surface 850, an outer side surface 842, an inner side surface 852, an outer bottom surface 844, an inner bottom surface 854, an outer top surface 846, and an inner top surface 856 as long as there are an equal amount of inner protrusions 858 and outer protrusions 859 located on each side of a center of each outer surface and inner surface and spaced an equal distance from the center of each inner surface and outer surface. Although protrusions 858 and 859 are illustrated in FIG. 14 as being of cylindrical shape, protrusions 858 and 859 can be of any suitable shape.

Each inner surface includes a depression 860 and each outer surface of frame member 826 includes a depression 861 located about each inner protrusion 858 and each outer protrusion 859, respectively. As illustrated in FIG. 14, inner end surface 850, inner side surface 852, inner bottom surface 854, and inner top surface 856 includes a depression 860 and outer end surface (not illustrated in FIG. 14), outer side surface 842, outer bottom surface 844 and outer top surface 846 includes a depression 861 located about each inner protrusion 858 and outer protrusion 859. One depression 861 is recessed from outer side surface 842 towards inner side surface 852. Opposite this depression includes one depression 860 recessed from inner side surface 852 towards outer side surface 842. One depression 861 is recessed from outer bottom surface 844 towards inner bottom surface 854. Opposite this depression includes a depression 860 recessed from inner bottom surface 854 towards outer bottom surface 844. One depression 861 is recessed from outer top surface 846 towards inner top surface 856. Opposite this depression includes a depression 860 recessed from inner top surface 856 towards outer top surface 846. Another depression (although not illustrated in FIG. 14) is recessed from an outer end surface towards inner end surface 850. Opposite this depression includes a depression 860 recess form inner end surface 850 towards the outer end surface (not illustrated in FIG. 14). Such depressions 860 and 861 that are positioned about protrusions 858 and 859 allow the protrusions to have an otherwise unavailable increased height or thickness if the protrusions extended from outer surface or inner surfaces.

An increased height or thickness allows the protrusions to act as vibration dampers independently from the shock absorbing frame 826 in the presence of vibration and shock emanating from a host device. In particular, each depression 860 and 861 includes a recessed surface 862 and 863, respectively, that are recessed from an outer end surfaces (not illustrated in FIG. 14), inner end surface 850, outer side surface 842, inner side surface 852, outer bottom surface 844, inner bottom surface 854, outer top surface 846 and inner top surface 856. Each outer protrusion 859 extends from a recessed surface 863 and outwardly from the outer end surface (not illustrated in FIG. 13), outer side surface 842, outer bottom surface 844 or outer top surface 846 to contact a casing of a host device 800 as illustrated in phantom (indicated in dashed lines). Each inner protrusion 858 extends from recessed surface 862 and inwardly from inner end surface 850, inner side surface 852, inner bottom surface 854 or inner top surface 856 to contact a rotatable data storage device 801 as illustrated in phantom (indicated in dashed lines). Therefore, shock absorber 826 can effectively absorb a high amount of shock using its frame, and shock absorber 826 can simultaneously damp vibration effectively using protrusions 858 and 859.

Both outwardly extending outer protrusions 859 and inwardly extending inner protrusion 858 dampen vibration that affects rotatable data storage device 801. Outer protrusions 859 can outwardly extend from each recessed surface 862 a thickness dimension 865 of approximately 1.0 mm or less. In FIG. 14, outer protrusions 859 extend from each recessed surface 863 a thickness dimension 865 of 0.6 mm. In FIG. 14, outer protrusions 859 extend outwardly from outer end surface (not illustrated in FIG. 14), outer side surface 842, outer bottom surface 844 and outer top surface 846 by 0.2 mm. Inner protrusions 858 can inwardly extend from each recessed surface 862 a thickness dimension 864 of approximately 1.0 mm or less. In FIG. 14, inner protrusions 858 extend from each recessed surface 862 a thickness dimension 864 of 0.6 mm. In FIG. 14, inner protrusions 858 extend from outer end surface 850, inner side surface 852, inner bottom surface 854 and inner top surface 856 by 0.2 mm.

Figure 15:
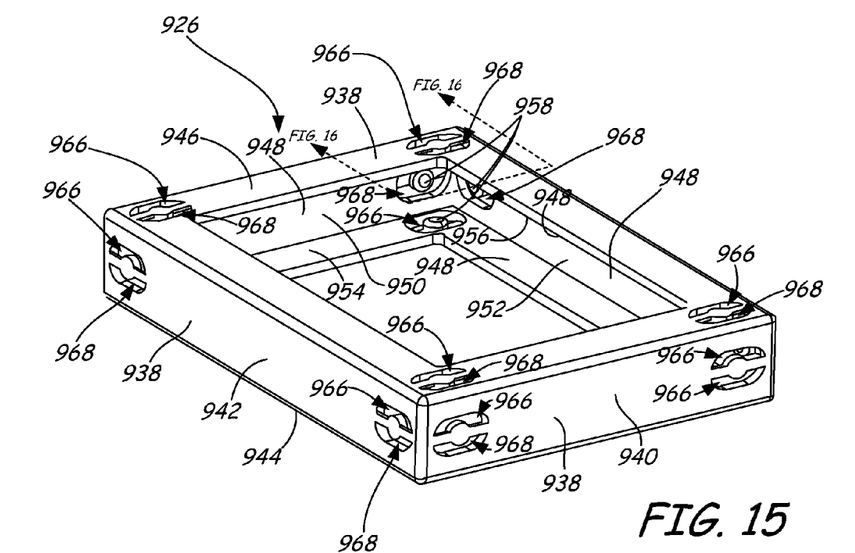
FIG. 15 illustrates a perspective view of a shock absorber that partially surrounds an enclosure of a data storage device.

FIG. 15 illustrates a perspective view of yet another embodiment of a shock absorber 926 that is capable of partially surrounding an enclosure of a rotatable data storage device (not illustrated in FIG. 15). Shock absorber 926 is effective in absorbing a high amount of shock as well as effective in vibration damping. Shock absorber 926 is a single shock absorbing frame member that surrounds a portion of an outer surface of enclosure. It should be understood that shock absorber 926 could, in the alternative, include a pair of shock absorbing members as illustrated in FIGS. 4 and 9.

Frame member 926 includes a plurality of surfaces. Frame member 926 includes six outer surfaces 938. Two of the outer surfaces are outer end surfaces 940 (of which one is illustrated in FIG. 15), two of the outer surfaces are outer side surfaces 942 (of which one is illustrated in FIG. 15), one of the outer surfaces is an outer bottom surface 944 and one of the outer surfaces is an outer top surface 946. Frame member 926 includes six inner surfaces 948 (of which some are shown in FIG. 15). Two of the inner surfaces are inner end surfaces 950 (of which one is illustrated in FIG. 15), two of the inner surfaces are inner side surfaces 952 (of which one is illustrated in FIG. 15), one of the inner surfaces is an inner bottom surface 954 and one of the outer surfaces is an inner top surface 956.

At least two inner protrusions 958 protrude from a surface of single frame member 926. As illustrated at least partially in FIG. 15, at least two inner protrusions 958 protrude from inner end surfaces 950, at least two inner protrusions 958 protrude from inner side surfaces 952, at least two outer protrusions 958 protrude from inner bottom surface 954 and at least two inner protrusions 958 protrude from inner top surface 956. Although frame member 926 includes two inner protrusions 958 protruding from inner end surfaces 950, inner side surfaces 952, inner bottom surfaces 954 and inner top surface 956, it should be realized that any number of inner protrusions can be formed with any of these surfaces as long as there are an equal amount of inner protrusions 959 located on each side of a center of each inner surface 948 and spaced an equal distance from the center of each inner surface. In addition, it should be realized that like FIGS. 9-13, protrusions 958 could in the alternative or in addition to protrude from outer surface 938 of frame member 926. Although inner protrusions 958 are illustrated in FIG. 15 as being of cylindrical shape, inner protrusions 958 can be of any suitable shape.

Frame member 926 includes a plurality of apertures, where each aperture is located adjacent an inner protrusion 958. In particular, a first aperture 966 and a second aperture 968 extend between outer end surface 940 and inner end surface 950 and are located adjacent each inner protrusion 958 protruding from inner end surface 950. A first aperture 966 and a second aperture 968 extend between outer side surface 942 and inner side surface 952 and are located adjacent each inner protrusion 958 protruding from inner side surface 952. A first aperture 966 and a second aperture 968 extends between outer bottom surface 944 and inner bottom surface 954 and are located adjacent each inner protrusion 958 protruding from inner bottom surface 954. A first aperture 966 and a second aperture 968 extend between outer top surface 946 and inner top surface 954 and are located adjacent each inner protrusion 958 protruding from inner top surface 954.

Figure 16:
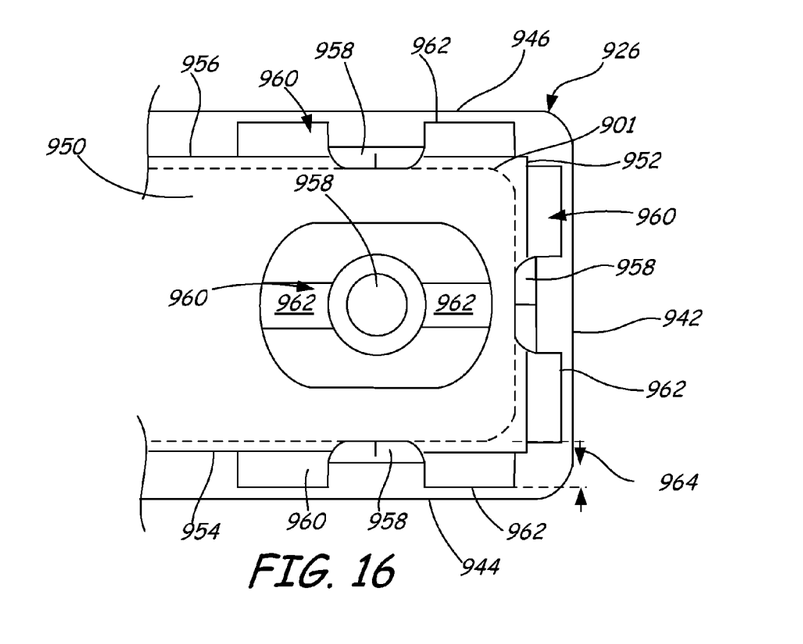
FIG. 16 illustrates a sectional view of a portion of a frame member of the shock absorber illustrated in FIG. 15.

FIG. 16 illustrates a sectional view of a portion of frame member 926 of FIG. 15. The sectional view is taken along dashed lines indicated in FIG. 15. FIG. 16 illustrates section views of inner protrusions 958 protruding from inner side surface 952, inner bottom surface 954 and inner top surface 956. FIG. 16 also illustrates an inner protrusion 958 protruding from inner end surface 950.

Besides a first aperture 966 and second aperture 968 (FIG. 15) formed adjacent each inner protrusion 958, each inner surface 948 (FIG. 15) of frame member 926 includes a depression 960 located on either side of each inner protrusion 958. One depression 960 is recessed from inner side surface 952 towards outer side surface 942, one depression 960 is recessed from inner bottom surface 954 towards outer bottom surface 944, one depression 960 is recessed from inner top surface 956 towards outer top surface 946 and depression 960 is recessed from inner end surface 950 towards outer end surface 940 (FIG. 15). Such depressions 960 about inner protrusions 958 allow the protrusions to have an increased height or thickness otherwise unavailable if the protrusions extend from an inner surface 948. An increased height or thickness allows the protrusions to act as vibration dampers independently from the shock absorbing frame 926. In particular, each depression 960 includes a recessed surface 962 that are recessed from inner end surface 950, inner side surface 952, inner bottom surface 954 and inner top surface 956. Each inner protrusion 958 extends from recessed surface 962 and inwardly from inner end surface 950, inner side surface 952, inner bottom surface 954 or inner top surface 956 to contact rotatable storage device 901 as illustrated in phantom (indicated in dashed lines). Inner protrusions 958 can inwardly extend from each recessed surface 962 a thickness dimension 964 of approximately 1.0 mm or less. In FIG. 16, inner protrusions 958 extend from each recessed surface 962 a thickness dimension of 1.0 mm. In FIG. 16, inner protrusions 958 protrude from inner end surface 950, inner side surface 952, inner bottom surface 954 and inner top surface 956 by 0.2 mm.

Figure 17:
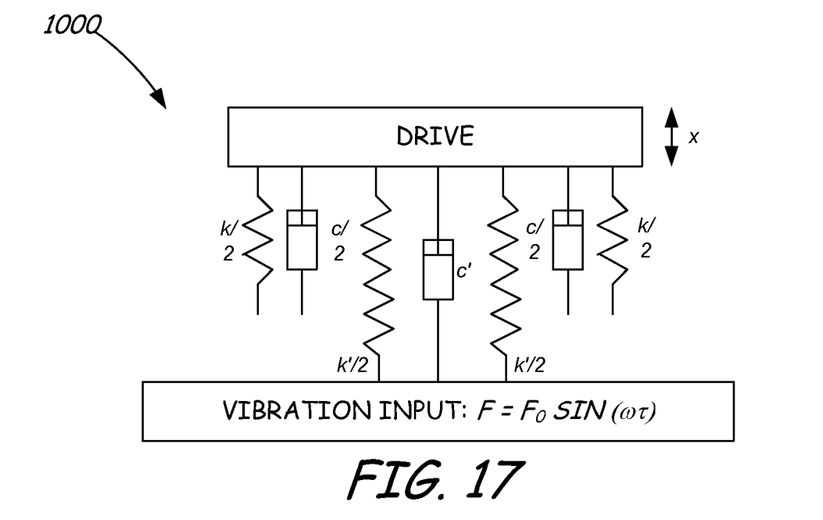
FIG. 17 illustrates a simplified block diagram of a vibration model describing the embodiments illustrated in FIGS. 4-16.

FIG. 17 illustrates a simplified block diagram of a vibration model 1000 of the embodiments discussed in FIGS. 4-16. Between a rotatable data storage device, such as rotatable data storage device 102 of FIG. 1, and a host device, such as host device 100 of FIG. 1, protrusions (represented by spring k' and damper c'), as depicted in FIGS. 4-16, are parallel (where k'/k<<1). When host device 100 vibrates at a frequency of less than 3 GHz, only the protrusions function. However, when a large shock occurs, the protrusions will be fully pressed and their function can be neglected because k' is a negligible small value compared with k. Therefore, the shock absorber performs the function of absorbing large shocks to protect the rotatable data storage device, while utilizing the protrusions to damp vibration. It should be understood that the shock absorber and the protrusions can be made of the same material or of different materials. Example materials include a variety of elastomeric materials, such as natural rubbers, ethylene propylene diene monomer (EPDM), styrene-butadiene rubbers, neoprene rubbers, nitrile rubbers, isoprene rubbers, polysulfide rubbers, urethane rubbers, silicone rubbers and combination thereof.

Figure 18:
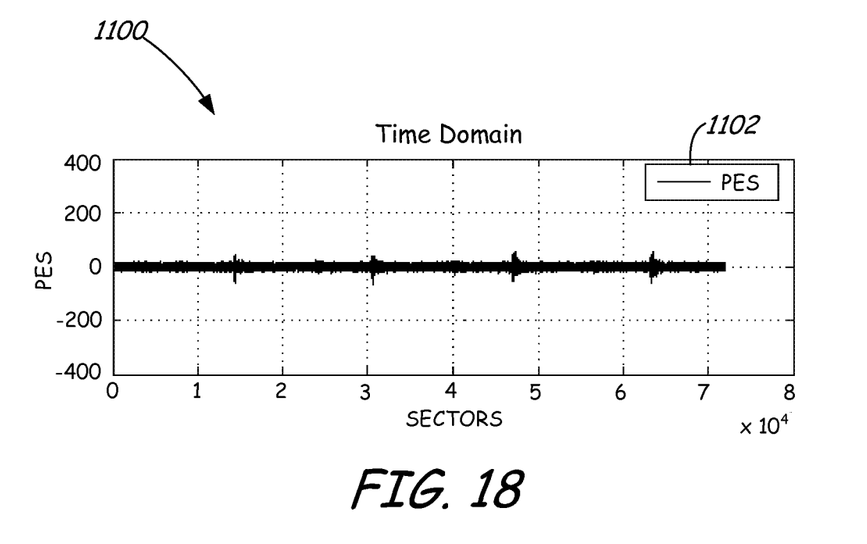
FIG. 18 illustrates a graphical representation of a position error signal as applied to a voice coil motor from a servo controller when a vibrator is activated in a mobile phone utilizing the shock absorber illustrated in the embodiments of FIGS. 4-16.

In addition, FIG. 18 illustrates a graphical representation 1100 of a position error signal (PES) 1102 as applied to a voice coil motor from a servo controller. The PES 102 in FIG. 18 represents a PES of a servo controller in a rotatable data storage device when there the shock absorbers illustrated in FIGS. 4-16 are utilized to both absorb shock as well as damp vibration when a vibrator or a speaker of a host device is activated. In comparison with FIGS. 2-3, it is easily shown that embodiments described in FIGS. 4-16 can effectively absorb shock and damp vibration.

It is to be understood that even though numerous characteristics and advantages of various embodiments of the disclosure have been set forth in the foregoing description, this disclosure is illustrative only, and changes may be made in detail, especially in matters of structure and arrangement of parts within the principles of the disclosure to the full extent indicated by the broad general meaning of the terms in which the appended claims are expressed. For example, the particular elements may vary depending on the particular application of the top cover while maintaining substantially the same functionality without departing from the scope and spirit of the disclosure. In addition, although the embodiments described herein are directed to a rotatable data storage device, it will be appreciated by those skilled in the art that the teachings of the disclosure can be applied to other types of data storage systems, without departing from the scope and spirit of the disclosure.

What is claimed is:

1. A shock absorber comprising:
   at least one shock absorbing frame member at least partially surrounding an electronic device enclosure and having at least a top wall, a bottom wall, an end wall and two opposing side walls, wherein each of the top, bottom, end and side walls includes outer facing surfaces and opposing inner facing surfaces, the inner facing surfaces facing the electronic device enclosure;
   at least one first recess in communication with and recessed from the outer facing surfaces of each of the top, bottom, end and side walls of the shock absorbing frame, each first recess including a first recessed surface that is positioned between the outer facing surface and the opposing inner facing surface; and
   wherein each first recess includes a first protrusion, each first protrusion extending from each first recessed surface to a distal end located outwardly from the outer facing surface.

2. The shock absorber of claim 1, wherein the at least one shock absorbing frame member partially surrounds a first end of the electronic device enclosure.

3. The shock absorber of claim 1, wherein the at least one shock absorbing frame member comprises a single, continuous frame member that partially surrounds a first end and a second end of the electronic device enclosure.

4. The shock absorber of claim 1, further comprising at least one second recess in communication with and recessed from the inner facing surfaces of each of the top, bottom, end, right and left sides of the shock absorbing frame, each second recess including a second recessed surface that is positioned between the inner facing surface and the opposing first recessed surface.

5. The shock absorber of claim 4, wherein each second recess comprises a second protrusion, each second protrusion extending from each second recessed surface to a distal end located inwardly from the inner facing surface for directly contacting the electronic device enclosure.

6. The shock absorber of claim 1, wherein the distal end of each first protrusion terminates outwardly from the outer facing surface for directly contacting a host device.

7. A shock absorber comprising:
   at least one shock absorbing frame member at least partially surrounding an electronic device enclosure and having at least a top wall, a bottom wall, an end wall and two opposing side walls, wherein each of the top, bottom, end and side walls include outer facing surfaces and opposing inner facing surfaces, the inner facing surfaces facing the electronic device enclosure;
   at least one first recess in communication with and recessed from the inner facing surfaces of each of the top, bottom, end and side walls of the shock absorbing frame member, each first recess including a first recessed surface that is positioned between the inner facing surface and the opposing outer facing surface; and
   wherein each first recess includes a first protrusion, each first protrusion extending from each first recessed surface to a distal end located inwardly from the inner facing surface.

8. The shock absorber of claim 7, further comprising at least one second recess in communication with and recessed from the outer facing surfaces of each of the top, bottom, end, right and left sides of the shock absorbing frame, each second recess including a second recessed surface that is positioned between the outer facing surface and the opposing first recess.

9. The shock absorber of claim 8, wherein each second recess comprises a second protrusion, each second protrusion extending from the second recessed surface to a distal end located outwardly from the outer facing surface for directly contacting a host device.

10. The shock absorber of claim 7, wherein each first recess recessed from the inner facing surfaces of each of the top, bottom and side walls of the shock absorbing frame member comprises first and second apertures, wherein the first and second apertures extend between each first recessed surface recessed from the inner facing surface and the opposing outer facing surface and are located adjacent to each first protrusion.

11. A shock absorber comprising:
   at least one shock absorbing frame member having at least a top wall, a bottom wall, an end wall and two opposing side walls at least partially surrounding a top surface, a bottom surface, a pair of side surfaces and an end surface of an electronic device enclosure, each of the top, bottom, end and side walls of the at least one shock absorbing frame member including outer facing surfaces and opposing inner facing surfaces, the inner facing surfaces facing the top surface, the bottom surface, the pair of side surfaces and the end surface of the electronic device enclosure;
   a plurality of first recesses in communication with and recessed from the outer facing surfaces of each of the top, bottom, end and side walls of the shock absorbing frame, each first recess including a first recessed surface that is positioned between the outer facing surface and the opposing inner facing surface;
   a plurality of first protrusions having distal ends, each first protrusion extending from each first recessed surface and terminating outwardly from the outer facing surfaces;
   a plurality of second recesses in communication with and recessed from the inner facing surfaces of each of the top, bottom, end and side walls of the shock absorbing frame, each second recess including a second recessed surface that is positioned between the inner facing surface and the opposing first recessed surface;

a plurality of second protrusions having distal ends, each second protrusion extending from each second recessed surface terminating inwardly from the inner facing surfaces for directly contacting with the top surface, the bottom surface, the pair of side surfaces and the end surface of the electronic device enclosure; and wherein the first protrusions are located opposite the second protrusions.

12. The shock absorber of claim 11, wherein each first protrusion is configured for directly contacting a host device.

13. The shock absorber of claim 7, wherein the distal end of each first protrusion is located inwardly from the inner facing surface for directly contacting the electronic device enclosure.

* * * * *

UNITED STATES PATENT AND TRADEMARK OFFICE
CERTIFICATE OF CORRECTION

| | | |
|---|---|---|
| PATENT NO. | : 8,702,073 B2 | Page 1 of 1 |
| APPLICATION NO. | : 11/749850 | |
| DATED | : April 22, 2014 | |
| INVENTOR(S) | : JuiJing Lim et al. | |

It is certified that error appears in the above-identified patent and that said Letters Patent is hereby corrected as shown below:

In the Claims

Column 12

Line 36, delete "bottom and side walls" and insert --bottom, end and side walls--

Signed and Sealed this
Twenty-first Day of April, 2015

Michelle K. Lee
*Director of the United States Patent and Trademark Office*